United States Patent
Schmitz et al.

(10) Patent No.: US 10,153,516 B2
(45) Date of Patent: Dec. 11, 2018

(54) OVERCHARGE PROTECTION ELECTROLYTE ADDITIVE FOR LITHIUM ION BATTERIES

(71) Applicant: Gotion, Inc., Fremont, CA (US)

(72) Inventors: Rene Schmitz, Stuttgart (DE); Arnd Garsuch, Ludwigshafen (DE); Frederick Francois Chesneau, St. Leon-Rot (DE); Michael Schmidt, Alsbach-Haehnlein (DE); Takeru Yamamoto, Yokohama (JP); Guenter Semrau, Ludwigshafen (DE)

(73) Assignee: Gotion Inc., Fremont, CA (US)

( * ) Notice: Subject to any disclaimer, the term of this patent is extended or adjusted under 35 U.S.C. 154(b) by 141 days.

(21) Appl. No.: 15/129,658

(22) PCT Filed: Mar. 26, 2015

(86) PCT No.: PCT/EP2015/056598
§ 371 (c)(1),
(2) Date: Sep. 27, 2016

(87) PCT Pub. No.: WO2015/144834
PCT Pub. Date: Oct. 1, 2015

(65) Prior Publication Data
US 2017/0179527 A1 Jun. 22, 2017

(30) Foreign Application Priority Data
Mar. 28, 2014 (EP) ................... 14162416

(51) Int. Cl.
*H01M 10/0567* (2010.01)
*H01M 4/587* (2010.01)
*H01M 10/0525* (2010.01)
*H01M 10/42* (2006.01)
*H01M 4/02* (2006.01)

(52) U.S. Cl.
CPC ....... *H01M 10/0567* (2013.01); *H01M 4/587* (2013.01); *H01M 10/0525* (2013.01); *H01M 10/4235* (2013.01); *H01M 2004/027* (2013.01); *H01M 2300/0025* (2013.01)

(58) Field of Classification Search
CPC ......... H01M 10/0567; H01M 10/0525; H01M 10/4235; H01M 4/587; H01M 2300/0025; H01M 2004/027
See application file for complete search history.

(56) References Cited

U.S. PATENT DOCUMENTS

| | | |
|---|---|---|
| 2003/0118912 A1 | 6/2003 | Watanabe et al. |
| 2010/0119953 A1 | 5/2010 | Watanabe et al. |
| 2010/0310942 A1 | 12/2010 | Watanabe et al. |
| 2014/0193707 A1 | 7/2014 | Schmidt et al. |

FOREIGN PATENT DOCUMENTS

| | | |
|---|---|---|
| EP | 1 335 445 A1 | 8/2003 |
| WO | WO 2013/026854 A1 | 2/2013 |

OTHER PUBLICATIONS

International Search Report dated Jun. 10, 2015 in PCT/EP2015/056598.
International Preliminary Report on Patentability and Written Opinion dated Oct. 4, 2016 in PCT/EP2015/056598.

*Primary Examiner* — Jane J Rhee
(74) *Attorney, Agent, or Firm* — Young Basile Hanlon & MacFarlane, P.C.

(57) ABSTRACT

The present invention relates to an electrolyte composition for lithium ion batteries which improves overcharge protection. In particular the present invention relates to an electrolyte composition comprising (a) a compound of general formula (I) and (b) at least two compounds of general formula (II) which are different from each other formula (II) with the definitions given in the description.

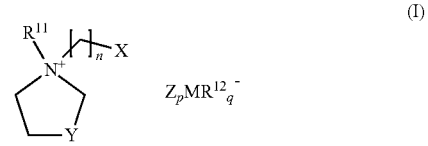

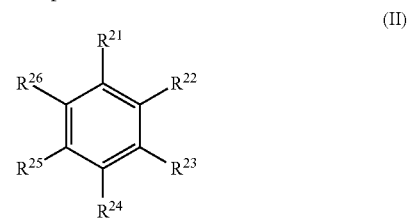

12 Claims, No Drawings

OVERCHARGE PROTECTION ELECTROLYTE ADDITIVE FOR LITHIUM ION BATTERIES

The present invention is in the field of overcharge protection additives in electrolytes which can be used for batteries such as lithium ion batteries.

Batteries, in particular lithium ion batteries, are currently among the most promising ways of storing energy for mobile applications such as portable electronic devices, electric tools, or electric vehicles. If lithium ion batteries are charged in excess of their nominal voltage, e.g. by a defect in the charging station, the batteries tend to heat up which can in the worst case lead to a thermal runaway. As lithium ion batteries typically comprise flammable components such as the electrolyte or the anode, the heat generated when overcharged can lead to ignition.

There are several ways of managing this safety hazard. EP 1 335 445 discloses a combination of aromatic compounds as electrolyte additives which oxidatively polymerize in the electrolyte when the battery is overcharged. However, for increasing safety demand the effect is still not good enough.

The object of the present invention was to increase the safety of a lithium ion battery, in particular its overcharge protection efficiency. At the same time it was aimed at obtaining lithium ion batteries with high electrochemical performance.

These objects were achieved by an electrolyte composition comprising
(a) a compound of general formula (I)

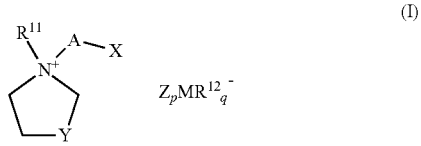

wherein
$R^{11}$ is an alkyl group in which one or more methylene groups may be replaced by oxygen atoms unless the methylene group is directly bound to the nitrogen atom,
X is

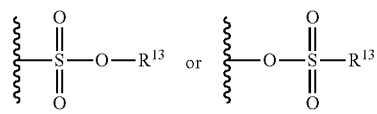

wherein $R^{13}$ is an alkyl group in which one or more methylene groups may be replaced by oxygen atoms unless bond to an oxygen atom,
A is an alkylene group in which one or more methylene groups may be replaced by oxygen atoms unless the methylene group is directly bound to the nitrogen atom and/or which may contain one or more double bonds,
Y is $CH_2$, O, S, or $NR^{14}$, wherein $R^{14}$ is an alkyl group,
Z is a bidentate group derived from oxalic acid, glycolic acid, 1,2-dihydroxyethane, malonic acid, 3-hydroxypropionic acid, or 1,3-dihydroxypropane, wherein the bidentate group is bound to
M via two of its oxygen atoms,
p is an integer from 0 to 3,
M is B or P,
$R^{12}$ is F, Cl, Br, I, an alkyl group which may be partially or fully halogenated, an alkoxy group which may be partially or fully halogenated or an acyloxy group which may be partially or fully halogenated,
q is an integer from 0 to 6,
and
(b) a compound of general formula (II)

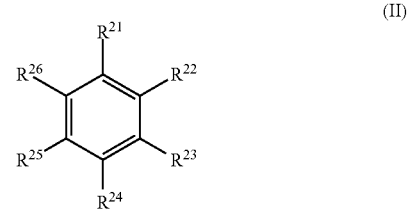

wherein $R^{21}$, $R^{22}$, $R^{23}$, $R^{24}$, $R^{25}$, $R^{26}$ are independent of each other H, F, Cl, Br, I; an alkyl group which may be substituted by one or more halogen atoms and/or in which one or more methylene groups may be replaced by an oxygen atom; or an aryl group which may be substituted by halogens and/or by alkyl groups which may be independent of each other substituted by one or more halogen atoms and/or in which one or more methylene groups may be replaced by an oxygen atom.

The present invention also relates to the use of the mixture of the compound of general formula (I) and the compound of general formula (II) according to the present invention as overcharge protection additive in an electrolyte composition.

The present invention also relates to a lithium ion battery comprising the electrolyte composition according to the present invention.

Preferred embodiments of the present invention can be found in the description and the claims. Combinations of different embodiments fall within the scope of the current invention.

The electrolyte composition according to the present invention is preferably liquid under conditions in which it is typically used. More preferably it is liquid at atmospheric pressure at a temperature between −40° C. and 120° C., even more preferably it is liquid at atmospheric pressure at a temperature between −20° C. and 80° C., in particular it is liquid at atmospheric pressure at a temperature between 0° C. and 50° C.

In general an electrolyte composition is a substance or a mixture with high ionic conductivity. Typically, liquid electrolyte compositions show ionic conductivities at room temperature of at least $10^{-5}$ S/cm$^{-2}$, preferably at least $10^{-4}$ S/cm$^{-2}$, and more preferably at least $10^{-3}$ S/cm$^{-2}$.

The electrolyte composition according to the present invention comprises a compound of general formula (I). This means that the electrolyte composition comprises either one or more than one compounds of general formula (I).

$R^{11}$ is an alkyl group in which one or more methylene groups may be replaced by oxygen atoms unless the methylene group is directly bound to the nitrogen atom. Alkyl groups include linear alkyl groups like methyl, ethyl, n-propyl, n-butyl, n-pentyl, n-hexyl, n-heptyl, n-octyl, n-nonyl, n-decyl; branched alkyl groups such as iso-propyl, iso-butyl, sec-butyl, tert-butyl, 2-methyl-pentyl, 2-ethyl-hexyl; and cyclic alkyl groups such as cyclopropyl, cyclopentyl, cyclohexyl, cycloheptyl, indanyl, decalinyl, norbornyl, or adamatyl. One or more methylene groups may be replaced by oxygen atoms unless the methylene group is directly bound to the nitrogen atom. Preferably, every third methylene group is replaced by an oxygen atom. Preferably, $R^{11}$ is a $C_1$-$C_8$ alkyl group, more preferably linear $C_1$-$C_8$ alkyl group which is not substituted, even more preferably a $C_1$-$C_4$ alkyl group, in particular methyl.

According to the present invention X is

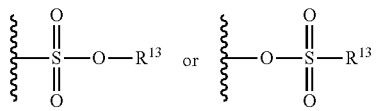

wherein $R^{13}$ is an alkyl group in which one or more methylene groups may be replaced by oxygen atoms. The definitions given above for $R^{11}$ equally apply for $R^{13}$ with the difference that a methylene group in $R^{13}$ bond to an oxygen atom cannot be replaced by an oxygen atom. However, the methylene group in $R^{13}$ directly bond to the sulfur atom can also be replaced by an oxygen atom. Preferably, the methylene group directly bond to the sulfur atom is not replaced by an oxygen atom. Preferably, X is

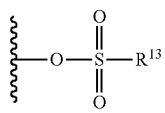

wherein it is preferred that $R^{13}$ is a $C_1$-$C_8$ alkyl group in which one or more methylene groups may be replaced by oxygen atoms unless bond to an oxygen atom. More preferably $R^{13}$ is methyl.

According to the present invention A is an alkylene group in which one or more methylene groups may be replaced by oxygen atoms unless the methylene group is directly bound to the nitrogen atom and which may contain one or more double bonds. Alkylene groups include methylene, ethylene, propylene, butylene, pentylene, hexylene, heptylene, octylene. Alkylene groups can also have branching points such as in methyl-ethylene, 2-ethyl-butylene, 2-ethyl-hexylene. Preferably, every third methylene group is replaced by an oxygen atom such that A becomes for example a polyethylene glycol or a polypropylene glycol group. A can contain one or more double bonds. Examples are vinylene, 1,2-propenylene, 1,3-propenylene, 1,4-but-2-2-enylen, 1,6-hex-3-enylene or 1,3-butadienylene. Preferably, A is a $C_1$-$C_8$ alkylene group, more preferably, A is a $C_1$-$C_4$ alkylene group, in particular an ethylene group.

According to the present invention Y is $CH_2$, O, S, or $NR^{14}$, wherein $R^{14}$ is an alkyl group. The definitions given above for $R^{11}$ equally apply for $R^{14}$. Preferably Y equals $CH_2$. It is more preferred that Y equals $CH_2$ and A is ethylene.

According to the present invention Z is a bidentate group derived from oxalic acid, glycolic acid, 1,2-dihydroxyethane, malonic acid, 3-hydroxypropionic acid, or 1,3-dihydroxypropane, wherein the bidentate group is bound to M via two of its oxygen atoms. Oxalic acid is preferred.

According to the present invention p is an integer from 0 to 3. If M is B, p is an integer from 0 to 2 due to the maximum of four bonds the boron atom can accommodate.

$R^{12}$ is F, Cl, Br, I, an alkyl group which may be partially or fully halogenated, an alkoxy group which may be partially or fully halogenated or an acyloxy group which may be partially or fully halogenated. Alkyl groups include linear alkyl groups like methyl, ethyl, n-propyl, n-butyl, n-pentyl, n-hexyl, n-heptyl, n-octyl, n-nonyl, n-decyl, and so on and branched alkyl groups such as iso-propyl, iso-butyl, sec-butyl, tert-butyl, 2-methyl-pentyl, 2-ethyl-hexyl, cyclopropyl, cyclopenyl, cyclohexyl, indanyl, norbornyl. Alkyloxy groups include linear alkoxy groups like methoxy, ethoxy, n-propoxy, n-butoxy, n-pentoxy, n-hexoxy, n-heptoxy, n-octoxy, n-nonoxy, n-decoxy, and branched alkoxy groups such as iso-propoxy, iso-butoxy, sec-butoxy, tert-butoxy, 2-methyl-pentoxy, 2-ethyl-hexoxy, cyclopropoxy, cyclohexoxy, indanoxy, norbornoxy. Acyloxy groups include linear aliphatic acyl groups like acetate, propionate, n-butanoate, n-pentanoate, n-hexanoate, n-heptanoate, n-octanoate, n-nonanoate, n-decanoate; branched aliphatic acyloxy groups like 2-methylpropionate, pivalate, 2-ethylhexanoate; and aromatic acyloxy groups like benzoate, O-metylsalicylate, anisolate, or methylbenzoic acid. The alkyl, alkoxy or acyl groups can be substituted by halogens. Examples are trifluoromethyl, chloromethyl, trichloro-iodoethyl, difluoroethyl, perfluoroethyl, perfluorohexyl, trifluoromethoxy, trichloromethoxy, trifluoroethoxy, chloroacetate, trichloroacetate, trifluoroacetate, trifluoropropionate, perfluoropropionate, perfluorobenzoate. $R^{12}$ is preferably F, Cl, an alkoxy group which may be partially or fully halogenated or an acyloxy group which may be partially or fully halogenated. More preferably, $R^{12}$ is F or an acyloxy group which may be partially or fully halogenated. If M is P, it is even more preferably that $R^{12}$ is F.

According to the present invention q is an integer from 0 to 6. If M is B q is an integer from 0 to 4 as the boron atom can bear four substituents at maximum. The parameters p and q are such that P has six bonds or B has four bonds. If M is P, this means that the equation 2p+q=6 is satisfied, if M is B, the equation 2p+q=4 is satisfied. If M is P it is particularly preferable that p equals 0, q equals 6 and $R^{12}$ equals F. In this case, the anion in the compound of general formula (I) is $PF_6^-$.

If M is B, q preferably equals 0 and p equals 2. In this case it is possible that the boron atom is substituted by the same two groups Z or two different ones. Preferably, the two Z groups are the same. In this case, the anion in the compound of general formula (I) becomes one of the following ones

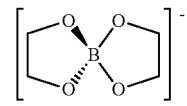

B-1

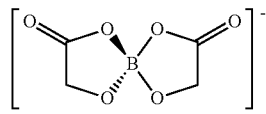

B-2

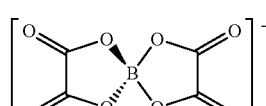

B-3

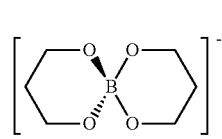

B-4

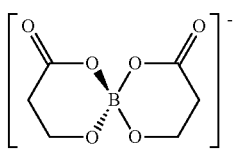

B-5

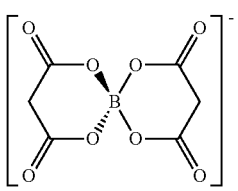

B-6

It is more preferable that p is 2, q is 0 and Z is oxalate. The anion in the compound of general formula (I) then is B-3.

According to the present invention the electrolyte composition normally comprises at least 0.1 wt.-% of a compound of general formula (I). If the electrolyte composition comprises more than 5 wt.-% of a compound of general formula (I) no further improvement can be observed. Preferably the electrolyte composition comprises from 0.3 to 2 wt.-% of a compound of general formula (I) in particular from 0.5 to 1 wt.-%. The wt.-% values are based on the total weight of the electrolyte composition. If the electrolyte composition comprises more than one compound of general formula (I), the weight ratios given above refer to the sum of the weights of all compounds of general formula (I).

The synthesis of the compound of general formula (I) is described in WO 2013/026 854.

The electrolyte composition according to the present invention further comprises a compound of general formula (II). This mean that the electrolyte composition comprises either one or more than one compound of general formula (II).

$R^{21}$, $R^{22}$, $R^{23}$, $R^{24}$, $R^{25}$, $R^{26}$ are independent of each other H, F, Cl, Br, I; an alkyl group which may be substituted by one or more halogen atoms and/or in which one or more methylene groups may be replaced by an oxygen atom; or an aryl group which may be substituted by halogens and/or by alkyl groups which may be independent of each other substituted by one or more halogen atoms and/or in which one or more methylene groups may be replaced by an oxygen atom. Alkyl groups include linear, branched and cyclic alkyl groups. Examples for alkyl groups are the same as those for $R^{11}$. Cyclic alkyl groups are preferred, in particular cyclohexyl. Examples for aryl groups are phenyl, naphthyl, anthracyl, phenanthryl, furanyl, pyrrolyl, thienyl, seleophenyl, oxazolyl, pyridyl, pyridazyl, pyridiminyl, pyrazyl, benzofuranyl, indolyl, benzothienyl, carbazolyl, dibenzothiophenyl, quinolinyl. Preferred aryl groups do not contain heteroatoms. Phenyl is particularly preferred.

Preferably, at least two of $R^{21}$, $R^{22}$, $R^{23}$, $R^{24}$, $R^{25}$, $R^{26}$ are H, more preferably at least four, in particular five. Some particularly preferred examples of the compound of formula (II) are biphenyl, o-terphenyl, p-terphenyl, and cyclohexylbenzene.

According to the present invention the electrolyte composition normally comprises at least 0.1 wt.-% of a compound of general formula (II). If the electrolyte composition comprises more than 20 wt.-% of a compound of general formula (II) no further improvement can be observed. Preferably the electrolyte composition comprises from 0.5 to 10 wt.-% of the compound of general formula (II), in particular from 2 to 7 wt.-%. The wt.-% values are based on the total weight of the electrolyte composition. If the electrolyte composition comprises more than one compound of general formula (II), the weight ratios given above refer to the sum of the weights of all compounds of general formula (II).

Preferably, the electrolyte composition according to the present invention comprises the compound of general formula (I) and the compound of general formula (II) in a weight ratio of 5:95 to 50:50, more preferably in a weight ratio of 10:90 to 30:70.

Preferably the electrolyte composition according to the present invention comprises two compounds of general formula (II) which are different from each other. More preferably the electrolyte composition comprises two compounds of general formula (II) in a weight ratio of 95:5 to 50:50, in particular in a weight ratio of 90:10 to 70:30.

More preferably, the electrolyte composition comprises at least two compounds of general formula (II) wherein in one compound of general formula (II) $R^{21}$ is a phenyl group which may be substituted by halogens and/or alkyl groups which may be substituted by one or more halogen atoms and/or in which one or more methylene groups may be replaced by an oxygen atom and in the other compound of general formula (II) $R^{21}$ is a cyclohexyl group which may be substituted by halogens and/or alkyl groups which may be substituted by one or more halogen atoms and/or in which one or more methylene groups may be replaced by an oxygen atom. Particularly preferably the electrolyte composition comprises biphenyl and cyclohexylbenzene. Particularly preferably the electrolyte composition comprises from 0.5 to 1.5 wt.-% of a compound of general formula (II) in which $R^{21}$ is an optionally substituted phenyl and from 2 to 5 wt.-% of a compound of general formula (II) in which $R^{21}$ is an optionally substituted cyclohexyl. The wt.-% values are based on the total weight of the electrolyte composition.

The presence of a compound of general formula (I) and a compound of general formula (II) in an electrolyte composition improves the safety of the lithium ion battery in which the electrolyte composition is employed. When this battery is charged over its nominal voltage, e.g. 4.2 V against a normal hydrogen electrode, hydrogen formation sets in which limits further overcharging and thus inhibits heating and finally ignition of the battery. The hydrogen gas can furthermore be used to separate the battery from the electricity source, for example if the expanding battery case stops the electric circuit. The amount of hydrogen formed upon overcharging at a certain voltage is a good measure of the safety gain of the battery. It can be measured if the battery is placed in a gas-proof non-expandable casing equipped with a pressure gage. The measured pressure is roughly proportional to the amount of hydrogen produced.

Preferably, the electrolyte composition additionally comprises at least one aprotic organic solvent. The solvent helps to dissolve any solid electrolyte component if present and/or improves the miscibility of electrolyte components in case they are not well miscible. Furthermore, it decreases the viscosity of the electrolyte composition rendering the electrolyte composition more conductive. Also, an aprotic organic solvent often decreases the price of the electrolyte composition. Aprotic in the context of the present invention means that the organic solvent does not form hydrogen when brought in contact to elemental lithium at atmospheric pressure and a temperature between −15° C. and 80° C. Formation of no hydrogen means that within one month less than 0.1 mol-% of hydrogen with regard to the at least one aprotic organic solvent is formed when the aprotic organic solvent is in contact with elemental lithium under the formerly mentioned conditions.

Examples for aprotic organic solvents are cyclic and/or noncyclic carbonates, dialkylethers, polyethers, cyclic ethers, cyclic and/or noncyclic acetales and/or ketales, orthocarboxylic acids esters, and cyclic and/or noncyclic esters of carboxylic acids, or mixtures thereof. Carbonates are preferred.

Examples for cyclic carbonates are ethylene carbonate, propylene carbonate, and butylene carbonate. One or more of the hydrogen atoms of the alkylene group can be substituted by an alkyl group, preferably a $C_1$-$C_4$ alkyl group, including methyl, ethyl, n-propyl, iso-propyl, n-butyl, iso-butyl, sec-butyl and tert-butyl. Noncyclic carbonates preferably bear two $C_1$-$C_{10}$ alkyl groups which may be the same or different, more preferably two $C_1$-$C_4$ alkyl groups which are the same or different. Examples of noncyclic carbonates are dimethyl carbonate, ethylmethyl carbonate, diethyl carbonate, methyl-isopropyl carbonate, methyl-sec-butyl carbonate, methyl-tert-butyl carbonate, and ethyl-isopropyl carbonate.

According to the present invention it is particularly preferred if the electrolyte composition contains as aprotic organic solvent a mixture of at least one cyclic carbonate and at least one noncyclic organic carbonate. Such mixtures ensure high solubility of solids in the electrolyte composition if present and at the same time low viscosity of the electrolyte composition rendering it highly conductive. It is particularly preferred if the electrolyte composition contains ethylene carbonate and diethyl carbonate or ethylene carbonate and ethylmethyl carbonate. Preferably, the at least one cyclic carbonate and the at least one noncyclic carbonate are present in the electrolyte composition in a weight ratio from 8:2 to 2:8, more preferably from 7:3 to 3:7, in particular from 6:4 to 4:6.

Examples of suitable dialkylethers are dimethylether, ethylmethylether, diethylether, diisopropylether, and di-n-butylether.

Examples of suitable polyethers are polyalkylene glycols, preferably poly-$C_1$-$C_4$-alkylene glycols and especially polyethylene glycols. Polyethylene glycols may comprise up to 20 mol-% of one or more $C_1$-$C_4$-alkylene glycols in copolymerized form. Polyalkylene glycols are preferably dimethyl- or diethyl-end capped polyalkylene glycols. The molecular weights, preferably reported as weight averages measured by size exclusion chromatography in water against PEG standards, of suitable polyalkylene glycols and especially of suitable polyethylene glycols span a wide range. It may be as low as 90 g/mol for dimethoxyethane. On the other hand, the molecular weight of suitable polyalkylene glycols and especially of suitable polyethylene glycols may be up to 5 000 000 g/mol, preferably up to 2 000 000 g/mol.

Examples of suitable cyclic ethers are tetrahydrofurane and 1,4-dioxane.

Examples of suitable noncyclic acetals are 1,1-dimethoxymethane and 1,1-diethoxymethane. Examples for suitable cyclic acetals are 1,3-dioxane and 1,3-dioxolane.

Examples of suitable orthocarboxylic acids esters are tri-$C_1$-$C_4$ alkoxy methane, in particular trimethoxymethane and triethoxymethane.

Examples for suitable noncyclic esters of carboxylic acids are ethyl acetate, methyl butanoate, esters of dicarboxylic acids like 1,3-dimethyl propanedioate, dialkyl glutarates, dialkyl adipates, dialkyl succinates. Dimethyl glutarate is preferred. An example of a suitable cyclic ester of carboxylic acids (lactones) is γ-butyrolactone.

The at least one aprotic organic solvent according to the present invention is preferably present to at least 50 wt.-% of the electrolyte composition, more preferably at least 60 wt.-% of the electrolyte composition, in particular at least 70 wt.-% of the electrolyte composition.

Preferred examples of the electrolyte composition according to the present invention include an electrolyte composition comprising from 50 to 80 wt.-% of the electrolyte composition a noncyclic carbonate, an electrolyte composition comprising from 50 to 80 wt.-% of the electrolyte composition a cyclic carbonate, an electrolyte composition comprising from 50 to 80 wt.-% of the electrolyte composition a dialkylether, an electrolyte composition comprising from 50 to 80 wt.-% of the electrolyte composition a polyether, an electrolyte composition comprising from 70 to 90 wt.-% of the electrolyte composition a noncyclic carbonate, an electrolyte composition comprising from 70 to 90 wt.-% of the electrolyte composition a cyclic carbonate, an electrolyte composition comprising from 70 to 90 wt.-% of the electrolyte composition a dialkylether, an electrolyte composition comprising from 70 to 90 wt.-% of the electrolyte composition a polyether, an electrolyte composition comprising from 50 to 90 wt.-% of the electrolyte composition a mixture of a cyclic and a noncyclic carbonate in a weight ratio from 8:2 to 2:8, an electrolyte composition comprising from 60 to 90 wt.-% of the electrolyte composition a mixture of a cyclic and a noncyclic carbonate in a weight ratio from 8:2 to 2:8, an electrolyte composition comprising from 70 to 90 wt.-% of the electrolyte composition a mixture of a cyclic and a noncyclic carbonate in a weight ratio from 8:2 to 2:8, an electrolyte composition comprising from 70 to 80 wt.-% of the electrolyte composition a mixture of a cyclic and a noncyclic carbonate in a weight ratio from 8:2 to 2:8, an electrolyte composition comprising from 50 to 90 wt.-% of the electrolyte composition a mixture of a cyclic and a noncyclic carbonate in a weight ratio from 6:4 to 4:6, an electrolyte composition comprising from 60 to 90 wt.-% of the electrolyte composition a mixture of a cyclic and a noncyclic carbonate in a weight ratio from 6:4 to 4:6, an electrolyte composition comprising from 70 to 90 wt.-% of the electrolyte composition a mixture of a cyclic and a noncyclic carbonate in a weight ratio from 6:4 to 4:6, an electrolyte composition comprising from 70 to 80 wt.-% of the electrolyte composition a mixture of a cyclic and a noncyclic carbonate in a weight ratio from 6:4 to 4:6.

Preferably the electrolyte composition according to the present invention further comprises at least one lithium salt. More preferably the at least one lithium salt is a monovalent salt, i.e. a salt with monovalent anions. Examples for lithium salts are $LiPF_6$, $LiPF_3(CF_2CF_3)_3$, $LiClO_4$, $LiAsF_6$, $LiBF_4$, $LiCF_3SO_3$, $LiN(SO_2F)_2$, $Li_2SiF_6$, $LiSbF_6$, $LiAlCl_4$, and salts of the general formula $(C_iF_{2i+1}SO_2)_jXLi$, where i and j are defined as follows:

j=1 when X is selected from oxygen and sulfur,
j=2 when X is selected from nitrogen and phosphorus,
j=3 when X is selected from carbon and silicon, and
i is an integer in the range from 1 to 20,
like $LiC(C_nF_{2n+1}SO_2)_3$ wherein i is an integer in the range from 1 to 20, and lithium imides such as $LiN(C_nF_{2n+1}SO_2)_2$, where i is an integer in the range from 1 to 20.

Very preferred are $LiPF_6$, $LiBF_4$, or $LiPF_3(CF_2CF_3)_3$, or mixtures thereof, in particular $LiPF_6$.

According to the present invention the at least one lithium salt is usually present to at least 0.01 wt.-% of the electrolyte composition, preferably at least 1 wt.-% of the electrolyte composition, and more preferred at least 5 wt.-% of the electrolyte composition. Typically the at least one lithium salt is present to not more than 10 wt.-% of the electrolyte composition.

The electrolyte composition according to the present invention preferably comprises
 a) from 0.1 to 5 wt.-% of the electrolyte composition at least one compound of general formula (I),
 b) from 0.1 to 20 wt.-% of the electrolyte composition at least one compound of general formula (II),
 c) from 0 to 99.8 wt.-% of the electrolyte composition at least one aprotic organic solvent, and
 d) from 0 to 10 wt.-% of the electrolyte composition at least one lithium salt.

The components comprised in the electrolyte composition according to the present invention should be of high purity to avoid undesirable side reactions which decrease the electrochemical performance in batteries. In particular, compounds with acidic groups should be absent or substantially absent which means that the electrolyte composition contains less than 50 parts per million based on the weight of the electrolyte composition (ppm).

According to the present invention the electrolyte composition is preferably free or substantially free from water. Substantially free in the context of the present invention means that the electrolyte composition contains less than 50 ppm water. Preferably the electrolyte composition contains from 3 to 30 ppm water and in particular from 5 to 25 ppm water.

Various methods are known to the person skilled in the art to determine the amount of water present in the electrolyte composition. A well suited method is the direct titration according to Karl Fischer, for example described in detail in DIN 51777-1 part 1 (1983). Free of water normally means that the amount of water is below the detection limit of 3 ppm water.

The mixture of a compound of general formula (I) and a compound of general formula (II) in the electrolyte composition according to the present invention acts as overcharge protection additive. Therefore the present invention also relates to the use of a mixture of a compound of general formula (I) and a compound of general formula (II) as overcharge protection additive in electrolyte compositions, preferably in electrolyte compositions suitable for the use in lithium ion batteries. Particular preferred is the use of a mixture of a compound of general formula (I) and at least two compounds of general formula (II) which are different from each other as overcharge protection additive in electrolyte compositions. The same details for the electrolyte composition as described above and for the lithium ion battery as described below apply.

The electrolyte composition according to the present invention is particularly well suited to produce lithium ion batteries. Therefore, the present invention also relates to a lithium ion battery comprising the electrolyte composition according to the present invention.

The lithium ion battery according to the present invention normally comprises in addition to the electrolyte composition an anode. Anodes include lithium intercalating carbonaceous anodes, such as an anode out of graphite, hard carbon or soft carbon; a lithium anode; a silicon anode; a lithium titanate anode; a tin-based anode, for example an amorphous tin-based composite oxide anode; an aluminum alloy anode; an anode from ternary metal vanadate alloyed with metals such as Al, Sn, and/or Sb; metalloids such as Si; intermetallic compounds as CoSn, $Cu_6Sn_5$, $Cu_2Sb$ (e.g. microporous $Cu_6Sn_5$—Sn anodes); metal/metalloid nanotubes; or an anode from silicone or nanomaterials such as hollow $Fe_3O_4$. Preferably, the lithium ion battery according to the present invention comprises a lithium intercalating carbonaceous anode, in particular a graphite anode.

The lithium ion battery according to the present invention typically further comprises a cathode. Suitable cathode materials include crystalline lithium metal oxides and lithium metal phosphates. The metals are typically transition metals, for example Mn, Ti, Co, Ni, Fe, Cr, V, Cu, Zn, and/or Mo. Other metals like Mg, Ca, Al, As and/or Sb are also possible. Ni, Co, Mn, and/or Fe are preferred.

Examples for crystalline lithium metal oxides are $LiMnO_2$, $LiCoO_2$, and $LiNiO_2$. Lithium metal oxides can also contain several metals. Preferred are lithium metal oxides of the general formula (X) $Li_{(1+)}[Ni_aCo_bMn_c]_{(1-z)}O_{2+e}$ wherein z is 0 to 0.3; a, b and c may be the same or different and are independently of each other from 0 to 0.8 wherein a+b+c=1; and −0.1≤e≤0.1. Preferred are transition metal oxides with layer structure having the general formula (X) wherein z is from 0.05 to 0.3, a id from 0.2 to 0.5, b is from 0 to 0.3 and c is from 0.4 to 0.8 wherein a+b+c=1; and −0.1≤e≤0.1. Preferred examples of lithium metal oxides of the general formula (X) are $Ni_{0.33}Co_0Mn_{0.66}$, $Ni_{0.25}Co_0Mn_{0.75}$, $Ni_{0.35}Co_{0.15}Mn_{0.5}$, $Ni_{0.21}Co_{0.08}Mn_{0.71}$, $Ni_{0.22}Co_{0.12}Mn_{0.66}$, and $Ni_{0.21}Co_{0.08}Mn_{0.71}$.

Examples for lithium metal phosphates are $LiFePO_4$, $LiCoPO_4$, $LiMnPO_4$, $LiNiPO_4$, and $Li_3V_2(PO_4)_3$. It is also possible that the lithium metal phosphate contains more than one metal. Examples are $LiFe_xMn_{1-x}PO_4$ or $LiFe_xCo_{1-x}PO_4$ wherein 0<x<1. Usually, lithium metal phosphates are in an ordered olivine crystal structure. Due to their low electric conductivity, it is advantageous if lithium metal phosphate particles contain a conductive additive such as conductive carbon. Usually, the conductive additive is present from 1 to 5 wt.-% of the lithium metal phosphate.

The cathode according to the present invention may further comprise electrically conductive materials like electrically conductive carbon and other components like binders. Compounds suited as electrically conductive materials and binders are known to the person skilled in the art.

For example, the cathode may comprise carbon in a conductive polymorph, for example graphite, carbon black, carbon nanotubes, graphene, or mixtures thereof. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrenebutadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile, or mixtures thereof.

Furthermore, the cathode may comprise a current collector which may be a metal wire, a metal grid, a metal web, a metal sheet, a metal foil or a metal plate. A suitable metal foil is aluminum foil.

The cathode can have a thickness from 25 to 200 µm, preferably from 30 to 100 µm, based on the whole thickness of the cathode without the thickness of the current collector.

The anode and cathode according to the present invention may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

Typically, batteries according to the present invention comprise one or more separators by which the electrodes are mechanically separated. Suitable separators are polymer films, especially porous polymer films, which are unreactive toward metallic lithium. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

It is also possible to select separators from polyethyleneterephthalate (PET) nonwovens filled with inorganic particles. Such separators may have a porosity in the range from 40 to 55%. Suitable pore diameters are, for example, in the range from 80 to 750 nm.

Batteries according to the present invention may further comprise a housing which may have any desired shape, for example cuboidal or the shape of a cylindrical sheet. In one variant, the housing used is a metal foil elaborated as a pouch.

Batteries according to the present invention can be combined with one another, for example in series connection or in parallel connection. Series connection is preferred.

The lithium ion batteries according to the present invention can be used in portable electric devices, such as power tools, cell phones, laptop computers. They can also be used for electric vehicles (EVs) including pure battery electric vehicles (BEVs), hybrid electric vehicles (HEVs), plug-in hybrid electric vehicles (PHEVs), and electric bicycles.

EXAMPLES

Example 1

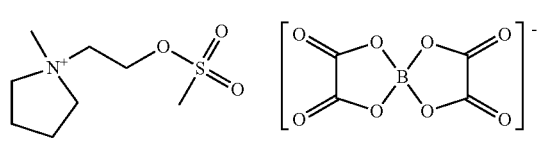

An electrolyte composition was prepared with a one molar solution of $LiPF_6$ in a mixture of 30 wt.-% ethylene carbonate and 70 wt.-% ethylmethyl carbonate to which 0.5 wt.-% C-1, 1 wt.-% biphenyl and 4 wt.-% cyclohexylbenzene were added.

Example 2

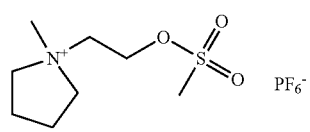

An electrolyte composition was prepared with a one molar solution of $LiPF_6$ in a mixture of 30 wt.-% ethylene carbonate and 70 wt.-% ethylmethylcarbonate to which 0.5 wt.-% C-2, 1 wt.-% biphenyl and 4 wt.-% cyclohexylbenzene were added.

Comparative Example 1

An electrolyte composition was prepared with a one molar solution of $LiPF_6$ in a mixture of 30 wt.-% ethylene carbonate and 70 wt.-% ethylmethylcarbonate to which 1 wt.-% biphenyl and 4 wt.-% cyclohexylbenzene were added.

Battery Safety Test a

Lithium ion batteries were prepared with the electrolyte compositions prepared in example 1 and comparative example 1. Therefore, lithium nickel cobalt manganese oxide ($LiNi_{0.33}Co_{0.33}Mn_{0.33}O_2$) electrodes with a capacity of 2 $mAh/cm^2$ and graphite electrodes with a capacity of 2.15 $mAh/cm^2$ were used. The separator was a glass-fiber filter (Whatmann GF/D), which was soaked with 200 μl of the respective electrolyte composition. The lithium ion batteries are filled in a gas-tight non-expandable casing equipped with a pressure gage. The lithium ion batteries are subject to the following test procedure, see table 1.

TABLE 1

| Cycle | Charge-/discharge rate in C | Cut-off potential/V upper/lower |
|---|---|---|
| 1-3 | 0.1 | 4.2/3.0 |
| 4-13 | 1 + 0.5 h constant voltage/current <0.2 C | 4.2/3.0 |
| 13 | 1 + 0.5 h constant voltage/current <0.2 C | No cut-off + 200% Overcharge |

The following pressures are measured at the end of the above test procedure for the lithium ion batteries, see table 2.

TABLE 2

| | Pressure in bar |
|---|---|
| Example 1 | 4.1 |
| Comparative Example 1 | 3.0 |

Electrochemical Performance Test

For the electrochemical performance test the batteries as described for the battery safety test was made with the difference that the separator is soaked with 120 μl of the respective electrolyte composition and no non-expandable casing was used, but instead coin-type full cells were assembled in an argon-filled glove box (Unilab, MBraun) having oxygen and water levels below 10 parts per million (ppm). Afterwards the test cells were transferred to a battery test station. Electrochemical cycling (charging/discharging) was done using a Maccor battery test system. The full cells were initially held at open circuit potential for 6 hours and subsequently charged to 4.2 V. Afterwards the cells were discharged to a low voltage cutoff of 3.0 V. Prior to the storage test all cells were cycled as follows: 1 cycle at 0.1 C, 1 cycle at 0.2 C, 10 cycles at 0.5 C at 25° C. All cells (charged to 4.2 V) were disconnected and transferred to a climate chamber in which they were stored for 7 days at 60° C. The cell voltage after storage and the cell capacity directly before and after storage at 60° C. storage for 7 days are summarized in the following table 3.

TABLE 3

| | Cell voltage after storage in V | Discharge capacity before storage in mAh/g | Discharge capacity after storage in mAh/g | Discharge capacity retention upon storage in % |
|---|---|---|---|---|
| Example 1 | 4.032 | 128 | 112 | 87.5 |
| Example 2 | 4.003 | 135 | 103 | 76.3 |
| Comparative Example 1 | 4.026 | 138 | 119 | 86.2 |

Battery Safety Test B

Pouch cells with 200 mAh were fabricated using lithium nickel cobalt manganese oxide (LiNi$_{0.5}$Co$_{0.2}$Mn$_{0.3}$O$_2$, NCM 523) as positive electrode material and a graphite electrode as a negative electrode with a polyolefin layer as separator. The electrolyte compositions were prepared as described above from ethylene carbonate (EC), ethyl methyl carbonate (EMC), LiPF$_6$, biphenyl (BP), cyclohexylbenzene (CHB) and compound C-1, the chemical structure of C-1 is shown in example 1. After formation of the cells the overcharge was carried out. A current of 200 mA was applied until a total charge capacity of 500 mAh or a potential of 4.8 V was reached. Subsequently, the cell was discharged with a current of 200 mA to 3 V and afterwards the volume of the cell was determined via the Archimedes principle. The difference in volume of the cell was calculated from the volume before and after the overcharge leading to the amount of gas formed during overcharge. The results are shown in table 4.

TABLE 4

| | Electrolyte composition | mL |
|---|---|---|
| Comparative Example 2 | 1M LiPF$_6$ in EC:EMC 3:7 by wt. + 1 wt.-% BP + 4 wt.-% CHB | 11.0 |
| Example 3 | 1M LiPF$_6$ in EC:EMC 3:7 + 1 wt.-% BP + 4 wt.-% CHB + 0.5 wt.-% C-1 | 23.0 |
| Comparative Example 3 | 1M LiPF$_6$ in EC:EMC 3:7 + 0.5 wt.-% C-1 | <0.1 |
| Example 4 | 1M LiPF$_6$ in EC:EMC 3:7 + 5 wt.-% CHB + 0.5 wt.-% C-1 | 8.7 |

As can be seen from table 4, the compound of formula (I) alone does not lead to any noteworthy gas formation, whereas the presence of one or two compounds of formula (II) shows a clear effect. The combination of one compound of formula (I) and one compound of formula (II) shows also an effect which is less pronounced than the combination of two compounds of formula (II). The combination of two compounds of formula (II) with one compound of formula (I) at the same overall concentration of compounds of formula (II) as in the electrolyte composition containing only one compound of formula (II) exhibits a drastically increased gas formation, i.e. the gas formation doubles in respect to the electrolyte composition without the compound of formula (I) or without the second compound of formula (II). This is a synergistic effect of the combination of at least two compounds of formula (II) and at least one compound of formula (I).

The invention claimed is:
1. An electrolyte composition comprising:
(a) a compound of formula (I)

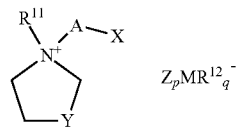

wherein R$^{11}$ is an alkyl group in which one or more methylene groups may be replaced by oxygen atoms unless the methylene group is directly bound to the nitrogen atom,
X is

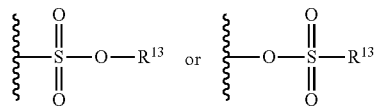

wherein R$^{13}$ is an alkyl group in which one or more methylene groups may be replaced by oxygen atoms unless bond to an oxygen atom,
A is an alkylene group in which one or more methylene groups may be replaced by oxygen atoms unless the methylene group is directly bound to the nitrogen atom and/or which may contain one or more double bonds,
Y is CH$_2$, O, S, or NR$^{14}$, wherein R$^{14}$ is an alkyl group,
Z is a bidentate group derived from oxalic acid, glycolic acid, 1,2-dihydroxyethane, malonic acid, 3-hydroxypropionic acid, or 1,3-dihydroxypropane, wherein the bidentate group is bound to M via two of its oxygen atoms,
p is an integer from 0 to 3,
M is B or P,
R$^{12}$ is F, Cl, Br, I, an alkyl group which may be partially or fully halogenated, an alkoxy group which may be partially or fully halogenated or an acyloxy group which may be partially or fully halogenated,
q is an integer from 0 to 6,
and
(b) at least two compounds of formula (II) which are different from each other

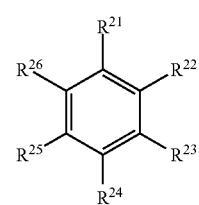

wherein, in each compound of formula (II), R$^{21}$, R$^{22}$, R$^{23}$, R$^{24}$, R$^{25}$, R$^{26}$ are independent of each other and represent H, F, Cl, Br, I; an alkyl group which may be substituted by one or more halogen atoms and/or in which one or more methylene groups may be replaced by an oxygen atom; or an aryl group which may be substituted by halogens and/or by alkyl groups which may be independent of each other substituted by one or more halogen atoms and/or in which one or more methylene groups may be replaced by an oxygen atom.

2. The electrolyte composition according to claim 1 wherein M is B, p is 2 and q is 0.

3. The electrolyte composition according to claim 1, wherein Z is derived from oxalic acid.

4. The electrolyte composition according to claim 1, wherein Y is $CH_2$ and A is ethylene.

5. The electrolyte composition according to claim 1, wherein the compound of formula (I) is present from 0.3 to 2% of the total weight of the electrolyte composition.

6. The electrolyte composition according to claim 1, wherein X is

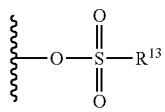

and $R^{13}$ is an $C_1$-$C_8$ alkyl group in which one or more methylene groups may be replaced by oxygen atoms unless bond to an oxygen atom.

7. The electrolyte composition according to claim 1, wherein:
in one compound of formula (II), $R^{21}$ is a phenyl group which may be substituted by halogens and/or alkyl groups which may be substituted by one or more halogen atoms and/or in which one or more methylene groups may be replaced by an oxygen atom; and
in the other compound of formula (II), $R^{21}$ is a cyclohexyl group which may be substituted by halogens and/or alkyl groups which may be substituted by one or more halogen atoms and/or in which one or more methylene groups may be replaced by an oxygen atom.

8. The electrolyte composition according to claim 1, wherein;
one compound of formula (II) is biphenyl; and
the other compound of formula (II) is cyclohexylbenzene.

9. The electrolyte composition according to claim 1, wherein:
in one compound of formula (II), $R^{21}$ is an optionally substituted phenyl is present from 0.5 to 1.5% of the total weight of the electrolyte composition and
in the other compound of formula (II), $R^{21}$ is an optionally substituted cyclohexyl is present from 2 to 5% of the total weight of the electrolyte composition.

10. A lithium ion battery comprising the electrolyte composition according to claim 1.

11. The lithium ion battery according to claim 10, wherein the battery comprises a lithium intercalating carbonaceous anode.

12. A method of inhibiting battery overcharging, the method comprising adding a compound of formula (I)

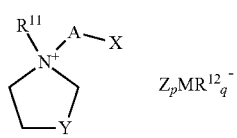

and at least two different compounds of formula (II)

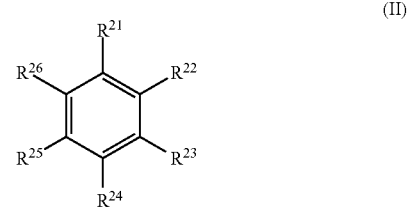

to an electrolyte composition,
wherein
$R^{11}$ is an alkyl group in which one or more methylene groups may be replaced by oxygen atoms unless the methylene group is directly bound to the nitrogen atom,
X is

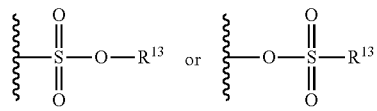

wherein $R^{13}$ is an alkyl group in which one or more methylene groups may be replaced by oxygen atoms unless bond to an oxygen atom,
A is an alkylene group in which one or more methylene groups may be replaced by oxygen atoms unless the methylene group is directly bound to the nitrogen atom and/or which may contain one or more double bonds,
Y is $CH_2$, O, S, or $NR^{14}$, wherein $R^{14}$ is an alkyl group,
Z is a bidentate group derived from oxalic acid, glycolic acid, 1,2-dihydroxyethane, malonic acid, 3-hydroxypropionic acid, or 1,3-dihydroxypropane, wherein the bidentate group is bound to M via two of its oxygen atoms,
p is an integer from 0 to 3,
M is B or P,
$R^{12}$ is F, Cl, Br, I, an alkyl group which may be partially or fully halogenated, an alkoxy group which may be partially or fully halogenated or an acyloxy group which may be partially or fully halogenated,
q is an integer from 0 to 6, and
wherein, in each compound of formula (II), $R^{21}$, $R^{22}$, $R^{23}$, $R^{24}$, $R^{25}$, $R^{26}$ are independent of each other and represent H; F; Cl; Br; I; an alkyl group which may be substituted by one or more halogen atoms and/or in which one or more methylene groups may be replaced by an oxygen atom; or an aryl group which may be substituted by halogens and/or by alkyl groups which may be independent of each other substituted by one or more halogen atoms and/or in which one or more methylene groups may be replaced by an oxygen atom.

* * * * *